(12) United States Patent
Conrad

(10) Patent No.: US 11,572,203 B2
(45) Date of Patent: Feb. 7, 2023

(54) RELEASE MECHANISM

(71) Applicant: Saab Bofors Dynamics Switzerland Ltd., Thun (CH)

(72) Inventor: Markus Conrad, Thun (CH)

(73) Assignee: Saab Bofors Dynamics Switzerland Ltd., Thun (CH)

( * ) Notice: Subject to any disclaimer, the term of this patent is extended or adjusted under 35 U.S.C. 154(b) by 0 days.

(21) Appl. No.: 17/370,028

(22) Filed: Jul. 8, 2021

(65) Prior Publication Data

US 2023/0010986 A1   Jan. 12, 2023

(51) Int. Cl.
*B64G 1/64* (2006.01)
*F42B 15/36* (2006.01)
*F16B 2/06* (2006.01)

(52) U.S. Cl.
CPC .............. *B64G 1/645* (2013.01); *F16B 2/065* (2013.01); *F42B 15/36* (2013.01); *Y10T 403/11* (2015.01)

(58) Field of Classification Search
CPC .......... B64G 1/645; F16B 2/065; F16B 4/002; F16B 5/02; F16B 31/005; F16B 2200/506; F42B 15/36; F42B 15/38; Y10T 403/11; Y10T 403/13; Y10T 403/645; Y10T 403/7067
USPC ........................................ 411/19, 20; 89/1.14
See application file for complete search history.

(56) References Cited

U.S. PATENT DOCUMENTS

| | | | | |
|---|---|---|---|---|
| 4,685,376 A | * | 8/1987 | Noel ........................ | F42B 15/38 89/1.14 |
| 5,372,071 A | * | 12/1994 | Richards ................. | F42B 15/38 89/1.14 |
| 6,125,762 A | * | 10/2000 | Fritz ........................ | F42B 15/38 89/1.14 |
| 7,261,038 B2 | * | 8/2007 | Cleveland ............... | F42B 15/38 89/1.14 |
| 7,513,184 B2 | * | 4/2009 | Kister .................... | B64G 1/645 89/1.14 |
| 8,141,491 B1 | * | 3/2012 | Travis ..................... | F42B 15/38 102/377 |
| 8,695,473 B2 | * | 4/2014 | Kametz ................... | F42B 15/38 89/1.14 |

(Continued)

FOREIGN PATENT DOCUMENTS

| | | | | |
|---|---|---|---|---|
| EP | 1319920 A1 | * | 6/2003 | ............. F42B 15/38 |
| FR | 3028608 A1 | * | 5/2016 | ............. F42B 15/38 |
| FR | 3028609 B1 | * | 5/2017 | ............. B64G 1/645 |

*Primary Examiner* — Josh Skroupa
(74) *Attorney, Agent, or Firm* — Rankin, Hill & Clark LLP

(57) ABSTRACT

A release mechanism for separating two components including: (i) a first plate-shaped member (1) with a first midplane (21) that is connectable to a first component and having two opposite first surfaces (3; 3') arranged parallel to the first midplane and a first coupling portion (5); (ii) a second plate-shaped member (2) with a second midplane (22) that is connectable to a second component and having two opposite second surfaces (4; 4') arranged parallel to the second midplane and a second coupling portion (6); (iii) an explosive (9) arranged in the first coupling portion and/or the second coupling portion or between them; and (iv) a plurality of protrusions (10) provided on and firmly connected to at least one of the first surfaces and/or the second surfaces. The first member and the second member are coupled to each other in a mutual midplane comprising the first midplane and the second midplane.

20 Claims, 3 Drawing Sheets

(56) References Cited

U.S. PATENT DOCUMENTS

| | | | |
|---|---|---|---|
| 8,727,654 B2 | 5/2014 | Graham | |
| 9,027,481 B2* | 5/2015 | Kister | F42B 15/38 89/1.14 |
| 9,086,260 B2* | 7/2015 | Kister | F42B 15/38 |
| 10,934,029 B2* | 3/2021 | Bower | B64G 1/645 |
| 2012/0061520 A1* | 3/2012 | Graham | B64G 1/641 403/2 |
| 2013/0236234 A1* | 9/2013 | Kaczynski | B64G 1/645 403/2 |
| 2019/0168899 A1* | 6/2019 | Fairlie | F42B 15/38 |

* cited by examiner

RELEASE MECHANISM

BACKGROUND OF INVENTION

Field of Invention

The invention relates to a release mechanism for separating a first component and a second component.

Brief Description of Related Art

Several release mechanisms are well known in the launch vehicle industry for separating fairings from the space launch vehicle and release the spacecraft. Usually explosives are used for separating several components of the fairings from each other, wherein the use of the explosives has a disadvantage of producing shock waves, which may cause damages of the payloads. Therefore, shock attenuation systems are required.

Graham, U.S. Pat. No. 8,727,654, refers to a separation system with shock attenuation in form of longitudinal slots arranged in the manner that the shock wave does not travel directly from the point of detonation to the fasteners coupling the members to the attached components. Such system allows reduction of the shock wave influence to the components but does not eliminate entirely the undesired influence of the shock wave to the adjacent structure, so that most of the shock wave actually penetrates the structure.

BRIEF SUMMARY OF THE INVENTION

It is an object of the invention to provide a release mechanism allowing not only the reduction of the shock wave influence but also a prolongation of the shock wave, so that the rear portion of the shock wave is further attenuated when compared to the prior art.

The invention solves the posed problem with a release mechanism for separating two components, said release mechanism comprising:
i) a first member being plate-shaped with a first midplane and connectable to a first component and having two opposite first surfaces arranged parallel to the first midplane and a first coupling portion; and
ii) a second member being plate-shaped with a second midplane and connectable to a second component and having two opposite second surfaces arranged parallel to the second midplane and a second coupling portion; and
iii) an explosive being arranged in the first coupling portion and/or in the second coupling portion or between the first coupling portion and the second coupling portion;
iv) a plurality of protrusions being provided on at least one of the first surfaces of the first member and/or on at least one of the second surfaces of the second member, wherein the first member and the second member are coupled to each other in a mutual midplane comprising the first midplane and the second midplane; and
the protrusions are firmly connected to the first surfaces of the first member and/or to the second surfaces of the second member.

The advantage of the release mechanism according to the present invention is to be seen in the fact that the protrusions provided on the surface of the members connected to the releasable components are bent when the shock wave is transiting through the structure. Subsequently, the protrusions swing back in the opposite direction resulting in a force opposed to the shock wave before the back end of the shock wave passes the protrusions.

Consequently, the shock amplitude is reduced, while the duration of the shock is prolonged. As the protrusions swing back, a force opposite to the shock front is introduced into the structure. Since the original shock wave is long enough, the force is superimposed so that the rear portion of the shock wave is attenuated. Thus, the shock wave is damped twice in total: firstly by the mass of the protrusions, which must be set in motion, and secondly by the force that is introduced into the structure in a direction opposite to the shock wave when it swings back.

Further advantageous embodiments of the invention can be commented as follows:

In a special embodiment of the release mechanism the protrusions have the shape of a plate with a center plane arranged transversely to the mutual midplane.

In an additional embodiment the center planes of the protrusions are arranged perpendicularly relative to the mutual midplane.

Such protrusions can be made by cutting or etching of the first member resp. the second member.

In another embodiment of the release mechanism the protrusions have a shape of a cylinder with a center axis arranged transversely to mutual midplane.

In an additional embodiment the center axes of the cylindrical protrusions are arranged perpendicularly relative to the mutual midplane.

The advantage of the embodiment with the cylindrical protrusions is to be seen in the fact that the cylindrical protrusions are movable by the shock wave not only bidirectionally but also multi-directionally. Furthermore, such cylindrical protrusions can be screwed to the first member resp. the second member or fitted-in to the first member resp. the second member.

Additionally, such protrusions can be made from the material being different from the material of the first member resp. the second member.

In a special embodiment of the release mechanism the protrusions are hollow.

In another embodiment of the release mechanism the protrusions are solid.

In a further embodiment the first member and/or the second member comprise metal, preferably stainless steel, aluminum, wolfram or copper.

In a special embodiment the first member and/or the second member consist of metal, preferably of stainless steel, aluminum, wolfram or copper.

In a further embodiment the protrusions comprise silicon oxide ($SiO_2$).

In a special embodiment the protrusions consist of silicon oxide ($SiO_2$).

In an additional embodiment the protrusions have a length L measured parallel to the center plane and parallel the first midplane and/or the second midplane and a high H measured perpendicularly to the center plane and parallel to the first midplane and/or the second midplane, wherein the ration L to H is in the range between 1 and 300.

In a further embodiment the protrusions have a length L measured parallel to the center plane and parallel the first midplane and/or the second midplane and a width W measured parallel to the center plane and perpendicularly to the first midplane and/or the second midplane, wherein the ratio L to W is in the range between 0.02 and 30.

In a further embodiment the length L is in the range between 20 μm and 150 mm.

In a further embodiment the high H is in the range between 20 μm and 5 mm.

In a further embodiment the width W is in the range between 1 mm and 20 mm.

In a special embodiment of the release mechanism the first coupling portion or the second coupling portion is provided with a groove and the second coupling portion or the first coupling portion is formed as a tongue being insertable in the groove.

In a further embodiment of the release mechanism the first member and the second member are coupled to each other on their coupling portions, so that the coupling portions contact each other.

In a further embodiment the explosive is arranged in the first coupling portion and/or in the second portion.

In a further embodiment the first member and the second member are coupled to each other on their coupling portions, so that no contacting point of the coupling portions to each other is provided.

In a special embodiment the release mechanism comprises a middle portion and the first member and the second member are coupled to the middle portion by the first coupling portion and the second coupling portion.

In a further embodiment the first coupling portion and the second coupling portion are provided with grooves and the middle portion are provided with two tongues being insertable in the grooves.

In another embodiment the middle portion is provided with two grooves and the first coupling portion and the second coupling portion are formed as a tongue being insertable in the groove.

In another embodiment the first coupling portion or the second coupling portion is provided with a groove, wherein the second coupling portion or the first coupling portion is formed as a tongue and the middle portion comprises a tongue being insertable in the groove of the first coupling portion or the second coupling portion and a groove suitable for the insertion of the tongue of the second coupling portion or the first coupling portion.

In a further embodiment the first coupling portion and the second coupling portion is provided with bore holes, wherein the first coupling section and the second coupling portion are coupled to each other by means of longitudinal fastening elements (e.g. screws, bolts, rivets etc.) insertable into the bore holes.

In a special embodiment the first member and/or the second member comprises a plurality of longitudinal through-going slots.

In a further embodiment the first member and/or the second member comprises a plurality of longitudinal non-through-going slots.

The advantage of a combination of the plurality of protrusions and plurality of the longitudinal slots can be seen in the fact that the longitudinal slots prolongate the shock wave and reduce the amplitude, wherein the plurality of protrusions allows a further reduction of the rigidity due to the additional mass.

In an additional embodiment the protrusions are arranged above and below of the longitudinal slot measured relative to the first midplane and/or second midplane.

In a further embodiment first member and the second member do not comprise any hole having a non-circular shape.

In a further embodiment the explosive of the release mechanism is a detonating cord and the release mechanism comprises a detonator. Such an explosive may comprises RDX, HNS or PETN and the detonator may be RP87, PC23, with or without booster DM1101, PBXN-5.

In a special embodiment a predetermined breaking line is provided in the region of the explosive.

In an additional embodiment the predetermined breaking line is in the form of a longitudinal depression provided along the detonating cord at least on one of the first surfaces and/or one of the second surfaces.

In a further embodiment the plurality of the protrusions is provided in at least one row of the protrusions running parallel to the detonating cord. Alternatively, the protrusions are provided in two rows, preferably in three rows running parallel to the detonating cord.

In a special embodiment the plurality of the protrusions is provided along the predetermined breaking line.

In a preferred embodiment the protrusions are arranged in the manner that their center planes are arranged parallel to each other.

In a further embodiment the release mechanism comprises at least ten protrusions being identical in shape.

In an additional embodiment the mass of all protrusions provided on the first member relative to the mass of the first member is in the range between 0.2 and 9, preferably between 0.5 and 3.

In a further embodiment the mass of all protrusions provided on the second member relative to the mass of the second member is in the range between 0.2 and 9, preferably between 0.5 and 3.

In a further embodiment the plurality of the protrusions is arranged symmetrically on both opposite first surfaces and/or on both opposite second surfaces.

In another embodiment the plurality of the protrusions is arranged only on the one of two opposite first surfaces of the first component and/or on the one of two opposite second surfaces of the second component.

In a special embodiment the plurality of the protrusions is arranged on the same side of the mutual midplane.

In a further embodiment the plurality of the protrusions is able to oscillate in the frequency range of 3 kHz to 15 kHz.

In a special embodiment the number of all protrusions provided on the first member per $cm^2$ of the first member is in the range between 1/11 and 11.

In a further embodiment the number of all protrusions provided on the second member per $cm^2$ of the second member is in the range between 1/11 and 11.

In a special embodiment the protrusions are etched in $SiO_2$, so that the number of protrusions provided on the first member and/or second member per $cm^2$ is at most 3,000, preferably at most 2,500.

In an additional embodiment the protrusions are etched in $SiO_2$, so that the number of protrusions provided on the first member and/or second member per $cm^2$ is at least 100, preferably at least 500.

BRIEF DESCRIPTION OF THE DRAWINGS

Several embodiments of the invention will be described in the following by way of example and with reference to the accompanying drawings in which.

DETAILED DESCRIPTION OF THE INVENTION

Figure 1:
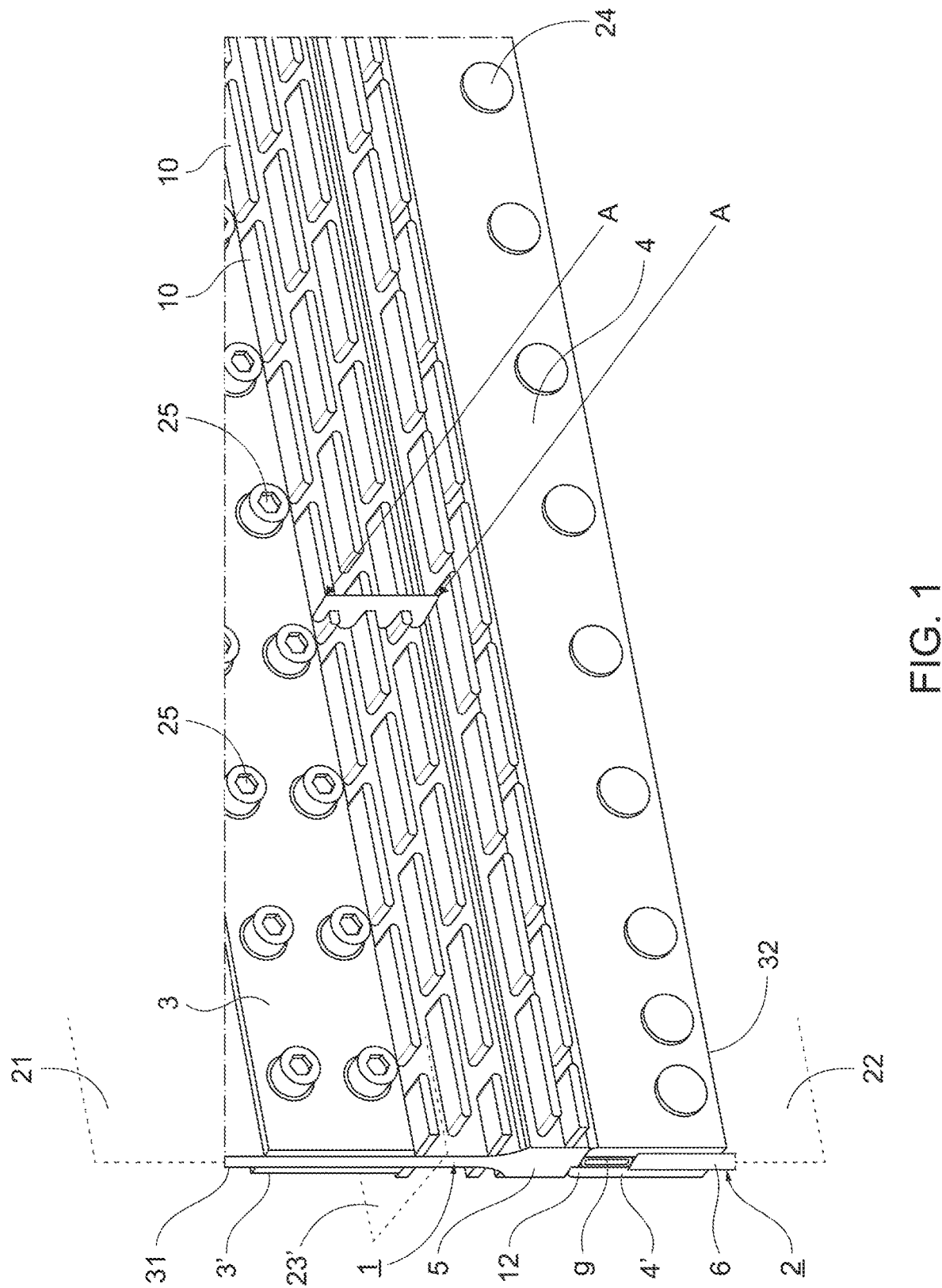
FIG. 1 illustrates a perspective view of an embodiment of the device according to the invention.

FIG. 1 illustrates an embodiment of the release mechanism for separating two components 31, 32 according to the invention. The release mechanism comprises a first member 1 having a form of a plate with a first midplane 21 and a second member 2 having a form of the plate with a second midplane 22. The first member 1 comprises two opposite first surfaces 3, 3' and a coupling portion 5, wherein the second member 2 comprises two opposite surfaces 4, 4' and a coupling portion 6. The first member 1 and the second member 2 are coupled to each other by means of their coupling portions 5, 6, wherein the first member 1 is connectable to a first component 31 and the second member 2 is connectable to a second component 32. The connection between the first member 1 and the first component 31 according to FIG. 1 is realized by means of bolts 25. The first member 1 and the second member 2 are coupled to each other in the manner that the first midplane 21 of the first member 1 and the second midplane 22 of the second member 2 constitute a mutual midplane comprising the first midplane 21 and the second midplane 22. In FIG. 1, the first coupling portion 5 of the first member 1 and the second coupling portion 6 of the second member 2 are provided with bores, so that the first member 1 and the second member 2 are coupled to each other directly by means of longitudinal fastening elements 24 inserted in the bores.

Figure 2:
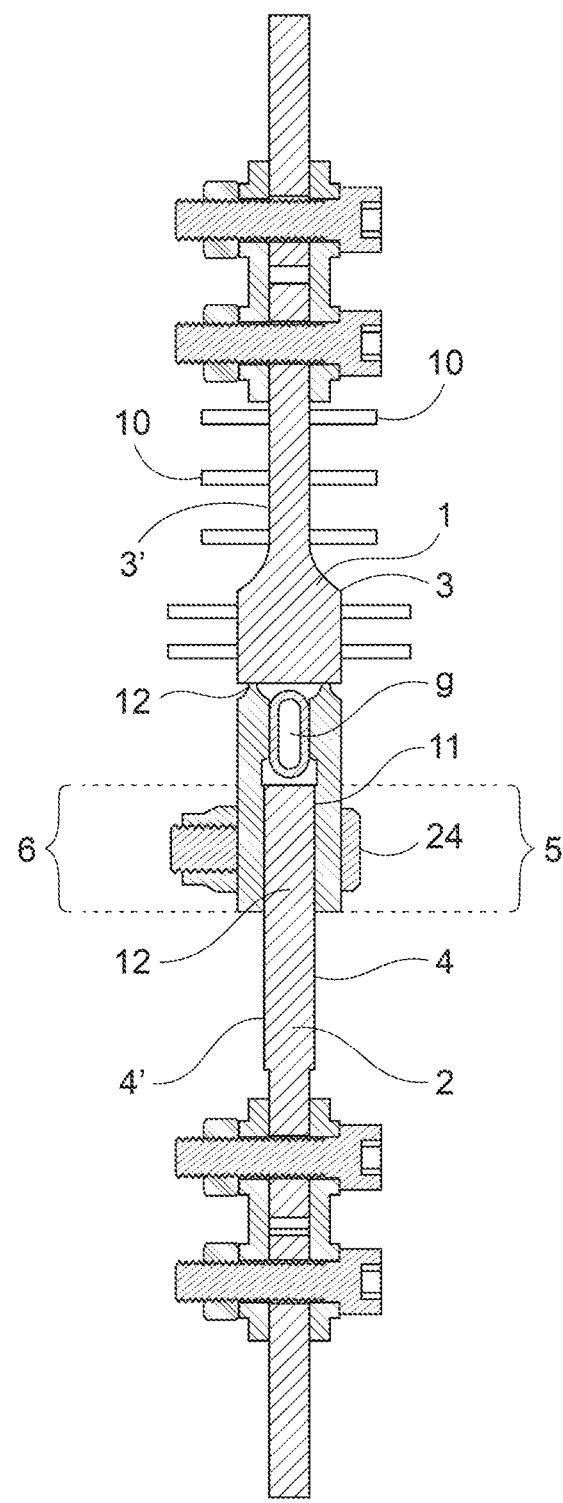
FIG. 2 illustrates a cross-section of an embodiment of the device according to the invention.

As shown in FIG. 2, the first coupling portion 5 of the first member 1 is formed as a groove 11 and the second coupling portion 6 is formed as a tongue inserted into the groove 11, wherein the first member 1 and the second member 2 are coupled in the region of the first and second coupling portions by means of bolts 24.

The first member 1 comprises a cavity with a detonating cord 9 therein. The first member 1 is provided on its two opposite surfaces 3, 3' with a plurality of protrusions having a plate-shaped form with a central plane 23 being perpendicularly to the first midplane 21 of the first member 1 and being arranged above the cavity with the detonating cord 9.

Figure 3A:
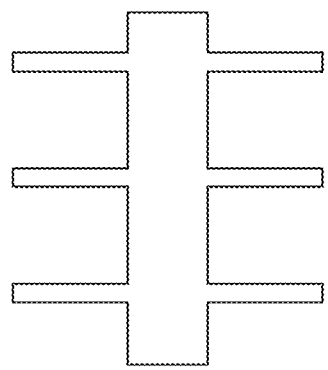
FIG. 3 illustrates the cross-section A-A as shown in FIG. 1.
Figure 3B:
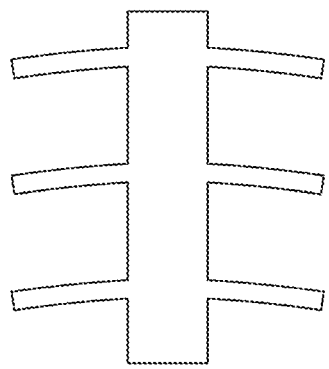
Figure 3C:
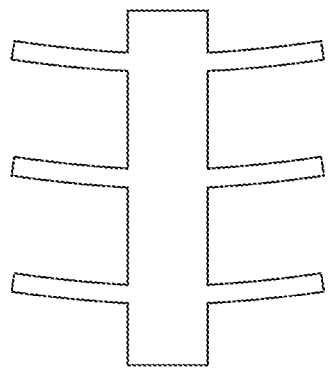

FIG. 3a shows the cross-section along the axis A-A as shown in FIG. 1 when the protrusions 10 are in the unstressed condition. FIG. 3b shows the movement of the protrusions when the shock wave passes through the structure starting from the detonating cord. The shock wave passes through the structure and sweep the part of the protrusions, which are firmly connected to the first member 1, causing the bending of the protrusions 10. In FIG. 3c the protrusions swing back in the opposite direction resulting in a force opposed to the shock wave.

The bending wave velocity in the protrusions is about ten times smaller than the shock wave velocity in the structure. The protrusions are designed to be correspondingly short. As a result, the opposing forces generated during back vibration are introduced into the structure before the rear end of the shock wave passes the protrusions. The shock wave is about 200 mm long and decays completely after 40 μs. During this time, the ten times slower bending wave in the protrusion must move towards the free end and back to the end firmly connected to the first member. Therefore, the length of a single protrusion is about 10 mm.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A release mechanism for separating two components, said release mechanism comprising:
    a first member being plate-shaped with a first midplane and connectable to a first component and having two opposite exposed exterior first surfaces arranged parallel to the first midplane and a first coupling portion;
    a second member being plate-shaped with a second midplane and connectable to a second component and having two opposite exposed exterior second surfaces arranged parallel to the second midplane and a second coupling portion;
    an explosive being arranged in the first coupling portion and/or in the second coupling portion or between the first coupling portion and the second coupling portion; and
    a plurality of protrusions being connected to at least one of the two opposite exposed exterior first surfaces of the first member and/or on at least one of the two opposite exposed exterior second surfaces of the second member;
    wherein the first member and the second member are coupled to each other in a mutual midplane comprising the first midplane and the second midplane.

2. The release mechanism according to claim 1, wherein the protrusions have the shape of a plate with a center plane arranged transversely to the mutual midplane.

3. The release mechanism according to claim 2, wherein the center planes of the protrusions are arranged perpendicularly relative to the mutual midplane.

4. The release mechanism according to claim 1, wherein the protrusions have a shape of a cylinder with a center axis arranged transversely to mutual midplane.

5. The release mechanism according to claim 4, wherein the center axes of the cylindrical protrusions are arranged perpendicularly relative to the mutual midplane.

6. The release mechanism according to claim 1, wherein the protrusions have a length L measured parallel to the center plane and parallel the first midplane and/or the second midplane, and wherein the length L is in the range between 20 μm and 150 mm.

7. The release mechanism according to claim 1, wherein the protrusions have height H measured perpendicularly to the center plane and parallel to the first midplane and/or the second midplane, and wherein the height H is in the range between 20 μm and 5 mm.

8. The release mechanism according to claim 1, wherein the protrusions have a width W measured parallel to the center plane and perpendicularly to the first midplane and/or the second midplane, and wherein the width W is in the range between 1 mm and 20 mm.

9. The release mechanism according to claim 1, wherein the first member and/or the second member comprises a plurality of longitudinal through-going slots.

10. The release mechanism according to claim 1, wherein the first member and/or the second member comprises a plurality of longitudinal non-through-going slots.

11. The release mechanism according to claim 9, wherein the protrusions are arranged above and below of the longitudinal slots measured relative to the first midplane and/or second midplane.

12. The release mechanism according to claim 1, wherein a predetermined breaking line is provided in the region of the explosive.

13. The release mechanism according to claim 12, wherein the release mechanism further comprises a detonating cord, and wherein the predetermined breaking line is in the form of a longitudinal depression provided along the detonating cord at least on one of the first surfaces and/or one of the second surfaces.

14. The release mechanism according to claim 12, wherein the release mechanism further comprises a detonating cord, and wherein the plurality of the protrusions is provided in at least one row of the protrusions running parallel to the detonating cord.

15. The release mechanism according to claim 12, wherein the plurality of the protrusions is provided along the predetermined breaking line.

16. The release mechanism according to claim 1, wherein the mass of all protrusions provided on the first member relative to the mass of the first member is in the range between 0.2 and 9.

17. The release mechanism according to claim 1, wherein the mass of all protrusions provided on the second member relative to the mass of the second member is in the range between 0.2 and 9.

18. The release mechanism according to claim 1, wherein the plurality of the protrusions is arranged symmetrically on both of the two opposite exposed exterior first surfaces and/or on both of the two opposite exposed exterior second surfaces.

19. The release mechanism according to claim 1, wherein the plurality of the protrusions is arranged only on the one of two opposite exposed exterior first surfaces of the first component and/or on the one of two opposite second surfaces of the second component.

20. The release mechanism according to claim 1, wherein the plurality of the protrusions is arranged on the same side of the mutual midplane.

* * * * *